Aug. 26, 1924.
W. AKEMANN
1,505,935
APPARATUS FOR DETERMINING A MAGNITUDE, WHICH VARIES WITH THE TIME
Filed Sept. 3, 1920
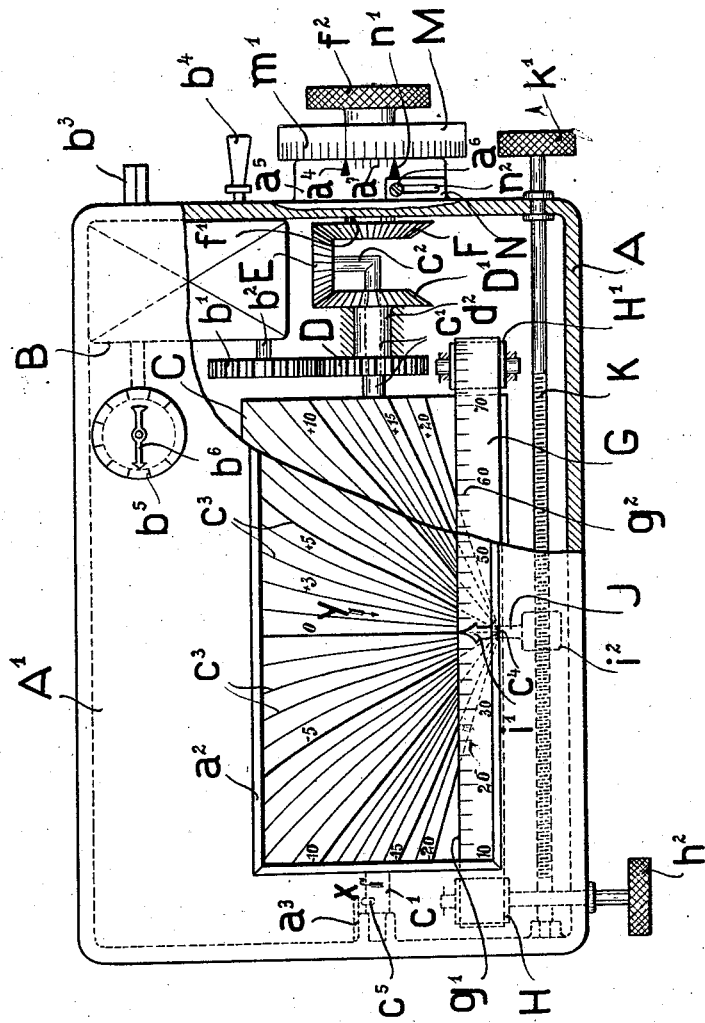
Inventor
Walter Akemann,
By Knight Bros.
attys Patented Aug. 26, 1924.

1,505,935

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

APPARATUS FOR DETERMINING A MAGNITUDE WHICH VARIES WITH THE TIME.

Application filed September 3, 1920. Serial No. 408,076.

*To all whom it may concern:*

Be it known that I, Dr. WALTHER AKEMANN, residing at Essen, Germany, a citizen of the German Republic, have invented a certain new and useful Improvement in Apparatus for Determining a Magnitude which Varies with the Time, of which the following is a specification.

This invention relates to apparatus for determining a magnitude which varies with time. The object of the invention is to provide an apparatus of this type which is of simple construction, which is easy to manipulate and enables both the variation at any time in the velocity of the magnitude sought and also the value of the magnitude itself referred to, the instant at which it is read off; or any other desired later moment, to be obtained directly without any measurement of time and without any calculation. This purpose is attained according to the invention by the fact, that a body and a graduation, which is situated opposite the surface of this body and divided into units of the desired magnitude, are caused to be movable relatively to each other transversely to the direction of the said graduation, and that the surface of the body is provided with a series of lines issuing from a point each of which corresponds to a fixed variation value (referred to the unit of time) of the magnitude to be determined and is so arranged, that on a relative movement taking place between the body and the graduation, it intersects the latter.

The invention is specially important when it is arranged for the determination of the range of a moving target, and is used as an auxiliary instrument when shooting at the moving target, because, in addition to being of simple construction and easy to manipulate, it enables variations in the range of the target (referred to the unit of time) to be determined without any measurement of time and conversion, and the range of the target (referred to the instant at which it is read off to any desired later instant of time) is enabled to be determined at once and with great accuracy.

The invention will be described with reference to the accompanying drawing, which shows a plan view of the apparatus partially in section.

In a portable box-shaped casing A, the contents of which are partially visible through a glass window $a^2$, let into the cover $A^1$ of the casing, is mounted a revolvable cylindrical drum C adapted to be driven at a uniform speed by a clockwork movement B. The drum C is driven by a spur wheel gearing $b^1$ D and a bevel wheel gearing $D^1$ E F constructed as a sun and planet gear.

Whereas one of the two spur wheels ($b^1$) is fixed on a driving shaft $b^2$ projecting from the clockwork movement B, the other one (D) is mounted on a hollow shaft $d^2$ which surrounds the drum shaft $c^1$ and carries at the same time one central wheel $D^1$ of the sun and planet gear. The second bevel wheel E, is mounted to rotate loosely as a planet wheel on a rectangularly bent arm $C^2$ on the drum shaft $c^1$, while the other central wheel F, is keyed on a shaft $f^1$, which is mounted to rotate in the wall of the casing and is provided with a hand wheel $f^2$.

The hand wheel $f^2$, which is connected to the drum C by the said sun and planet gear, is intended to impart an adjustment to the drum C independently of the action of the clockwork movement B.

In the interior of the casing A in the immediate vicinity of the external surface of the drum C and like it visible through the glass window $a^2$ in the cover $A^1$, is arranged a band G which runs parallel to the axis of the drum in a longitudinal direction, passes over two rollers H and $H^1$ and can be adjusted by the rotation of a hand wheel $h^2$ rigidly connected to one of the rollers (H). The edge $g^1$ of the band G lying next to the outer surface of the drum is divided according to a range graduation $g^2$, on which the distance apart of two division marks shows the unit of range chosen.

The reading-off marks corresponding to the range graduation $g^2$ are formed by a series of helical lines $c^3$, drawn on the outer surface of the drum, which emerge radially with a pitch of varying magnitude from a point $c^4$ on the outer surface, which point lies in the centre of a geometrical axis of the outer surface of the drum C and which reading-off marks extend at the maximum over half the outer surface. On the drum shaft $c^1$ is mounted a stop $c^5$, which, when the drum C rotates in the direction of the arrow $x$, is adapted to bear against a stop $a^3$ provided on an adjacent shaft bearing and in this position, which will be hereinafter termed the initial position of the drum, prevents the drum C from further rotation in the direction of the arrow $x$. The stops $c^5$ and $a^3$ are so arranged that the starting point $c^4$ of the series of curves $c^3$ is exactly opposite the reading off edge $g^1$ of the band G when the stop $c^5$ comes in contact with the stop $c^3$ when the drum C is rotated in the direction of the arrow $x$.

Each of the helical lines $c^3$ corresponds to a fixed, constant variation of range referred to the unit of time (e. g. minutes) which is based on the same unit of range (hm) as the graduation $g^2$ and which may be positive, negative or equal to zero. In such case, when the range graduation $g^2$ gives range values rising from left to right, the helical lines running from the starting point $c^4$ towards the left, give the negative and the helical lines running towards the right, the positive variation values in the range referred to the unit of time.

The rotation of the drum C, which is produced by the clockwork movement B and takes place in the direction of the arrow $y$, is at the same time so assumed that the helical lines $c^3$, which cut the reading off edge $g^1$ of the band G, diverge more and more, the further the rotation of the drum C continues. Furthermore the uniform speed of rotation imparted to the drum C, when the clockwise movement B is in action, is so chosen that the points of intersection of each of the lines $c^3$ move with the reading off edge $g^1$ in the unit of time selected by amounts, which are equal to the variations in the range, which have taken place in the unit of time.

Above the band G is arranged a pointer J, the point of which $i^1$ reaches to the reading off edge $g^1$ of the band G and this pointer is so arranged that the said point $i^1$ is likewise visible through the glass window $a^2$. The pointer J is fixed on a nut $i^2$, which can be moved along a screw spindle K mounted in the wall of the casing by rotating a hand wheel $k^1$ mounted outside the casing A and independently of the position of the band G, in such a way that the point of the pointer $i^1$ is able to travel over the entire graduation $g^2$ which is visible through the glass window $a^2$.

Upon the shaft $f^1$ of the hand wheel $f^2$, which acts on the rotation of the drum C through the sun and planet gear F E $D^1$ a graduated drum M is mounted which is provided with a seconds graduation $m^1$ so that it can be rotated independently of the hand wheel $f^2$ on its shaft $f^1$. The said drum is also provided with a device (not shown) e. g. a clamping screw for fixing it relatively to the shaft $f^1$. On the seconds graduation two reading off marks are located one of which, $a^4$ is situated on a cylindrical projection $a^5$ on the casing A, which surrounds the shaft $f^1$ and is intended to be used in a manner to be hereinafter described for allowing for the time of flight of the projectile, when determining the range of the target. The other reading off mark, $n^1$, is situated on a piece of sheetmetal N slotted in the direction of the periphery of the projection $a^5$ and guided by its slot $n^2$ on a pin $a^6$ which is screwed into the projection, $a^5$ and secured in the particular position in which it may happen to be.

The reading-off mark $n^1$ can be pushed along another seconds graduation $a^7$ which has only a few division marks and the zero mark of which is formed by the fixed mark $a^4$. The last mentioned reading off mark $n^1$ is used, when it is required to also make allowance for the so-called order and fire delay, that is to say, the time between the giving of the order to fire and actual discharge of the projectile when determining the range.

The clockwork movement is wound up by means of a projection $b^3$ which is square in cross section and which projects through the wall of the casing. By means of a releasing lever $b^4$ also accessible from outside the clockwork movement can be set going or stopped at any time. In order to determine when the clockwork movement must be wound again, there is located under a small round glass window let into the cover $A^1$ of the casing a small dial $b^5$, which gives the length of time for which the clockwork movement runs and over this dial travels a pointer $b^6$, which is driven by the clockwork movement itself.

To make the above described apparatus ready for use the clockwork movement B is wound up by means of a key pushed on to the projection $b^3$, until the pointer $b^6$ indicates an adequate length of run on the dial $b^5$. The drum C is also brought, by turning the hand wheel $f^2$ into its position of rest as determined by the stops $c^5$ and $a^3$ in which position the starting point $c^4$ of the series of curves $c^3$ lies exactly opposite the reading off edge $g^1$ of the band G. Finally by turning the hand wheel $k^1$ the point $i$ of the pointer J is set to the line $c^3$ marked on the outer surface of the drum and marked with the value zero.

When the man who manipulates the apparatus has had communicated to him the value of the range obtained for example by means of a range finder (not shown) he gives the distance at the moment of the moving target from the point where the apparatus described is mounted, and sets the corresponding division mark (e. g. 40 hm) of the graduation $g^2$ of the band G to the zero line of the drum C or to the pointer J coinciding therewith by turning the hand wheel $h^2$. The clockwork movement is then set going by moving over the releasing lever $b^4$ so that the drum C begins to rotate with uniform speed in the direction of the arrow $y$.

The man in charge now waits for the communication of a fresh range value (which may amount to say 42 hm) and immediately he receives this range, he determines the variation in the range which applies at the moment (referred to the unit of time) by means of one of the positive or negative helical lines on the drum C which on the range graduations $g^2$ just intersects the value of the range last given (i. e. for 42 hm the helical line which is denoted by the number $+3$). This value of the variation in the range having been read off (referred to the unit of time) the man manipulating the apparatus now passes to the gun to be pointed, where the knowledge of the variation in the range of the target can be allowed for, for the purpose of training the gun to correspond to the range.

As the helical lines $c^3$ give the variations in the range measured in a fixed unit of length (hm) and referred to the unit of time (minutes) and the range graduation $g^2$ is divided into equal units of length, it follows on the continued rotation of the drum that the point of intersection at any moment of the helical line coinciding (e. g. the one denoted by $+3$) with the graduation $g^2$ gives the ranges at the moment of the moving target which can therefore be read off at any moment at once.

This reading off of the ranges is facilitated by the fact that the man in charge takes care by turning the hand wheel $h^1$ that the pointer J registers at every instant with a point on the helical line coinciding (e. g. the one denoted by $+3$) and gives the range of the target at the moment on the range graduation $g^2$. The values of the range at the moment, which are determined in this way, are likewise passed on to the gun to be pointed and serve as a basis for the elevation to be imparted to the gun. These ranges of the target naturally only agree with the actual ranges of the target, as long as the previously determined variations in the range are maintained.

At certain intervals the man in charge of the apparatus described is informed on the basis of fresh measurements of the range, what the actual range of the target is. The man in charge then determines whether the line $c^3$ just used for reading off indicates the actual range on the graduations $g^2$ or not.

If now during the observation of the variable range (that is to say when the point of intersection of the helical line found e. g. the one denoted by $+3$ with the reading off edge $g^1$ moves towards the right along the graduation $g^2$) a fresh range value be communicated to the man in charge, which shows no agreement with the one, which he himself has read off on the graduation $g^2$, it follows therefrom, that the variation in the range of the target (referred to the unit of time) has become a different one. In this case the hand wheel $f^2$ is rotated in such a direction and at such a speed that the drum C rotates in the direction of the arrow $x$, until it has returned to its original position determined by the stops $c^5 a^3$.

At the same time the graduation $g^2$ is so adjusted by turning the hand wheel $h^2$, that the last actual range, communicated to the man in charge on the basis of the new measurement of the range, is situated opposite the line $c^3$ marked zero and the pointer J is also again set opposite this line. The cycle of operations now begins again and can be continued until either one of the range values communicated to the man in charge render a readjustment of the apparatus necessary (in the manner described) or until the drum C, which at the latest is the case after it has made half a revolution, has arrived in an angular position in which the reading off edge $g^1$ and curve $c^3$ just used as a reading off mark no longer intersect. Thus for example if the velocity imparted to the drum C by the clockwork movement is so great, that a revolution could be completed in six minutes, in this case the drum would have to be brought back into the original position at the latest every three minutes.

If the particular range, which is to form the basis of the adjustment of the elevation of the gun, after allowing for the time of flight of the projectile, the delay between the giving of the order to fire and the actual firing of the gun, is to be determined at once from the ranges communicated at any time to the man in charge by means of range finders or the like and the variations in the range are to be determined by him from these data and passed on to the gun, it is only necessary to operate the adjusting device $f^2$ M $m^1$ $a^4$ $n^1$, which is mounted on the casing A and which in conjunction with the sun and planet gear F E $D^1$ allows the drum C to be adjusted by an amount, which corresponds exactly to the amount of the time of flight at any time of the projectile and to the delay which occurs between the giving of the order to fire and the actual firing of the gun.

The said adjusting apparatus is used in the following way:—

The graduated disc M which is provided with a uniform seconds graduation $m^1$ corresponding to the time of flight of the projectile and which disc M, as stated above is adapted to rotate relatively to the shaft $f^1$ can be locked thereon (e. g. by a set screw not shown) is rotated, while the shaft $f^1$ is stationary, until the division mark of the graduation $m^1$ denoted by zero is opposite the fixed mark $a^4$ and then locked relatively to the shaft by tightening up the set screw.

For the further description of the use of the adjusting apparatus assume that, that range shall be able to be read off on the range graduation $g^2$ (ignoring the additional variations, which ensues in consequence of the delay between the giving of the order to fire and the actual firing of the gun) at which the target is after the expiration of a time of flight of the projectile corresponding to the range last determined.

In this case the hand wheel $f^2$ is rotated in the direction of the arrow $y$ until that division mark of the seconds graduation is opposite the fixed mark $a^4$, which corresponds to the time of flight of the projectile determined on the basis of the last measurement of range. By this rotation of the hand wheel $f^2$ the planet wheel E and with it the drum C is rotated in the direction of the arrow $y$ through a certain angle. It is therefore clear that the line $c^3$ (e. g. the one denoted by +3) hitherto utilised for reading off on the range graduation $g^2$ no longer indicates the range of the target at the moment and hereinafter denoted by S but a different one, which is hereinafter denoted by $S^1$, and, which it would have indicated on rotation alone of the drum C by the clockwork movement B only after the expiration of a certain time.

The ratios of transmission of the gearing interposed between the hand wheel $f^2$ and the drum C are so proportioned, that on the aforesaid rotation of the hand wheel $f^2$ the ranges capable of being read off on the graduation $g^2$ before and after this rotation, are connected by the relationship 1. $S^1 = S + v$.

In this equation for which the interpretation of the letters $S^1$ and S has already been given, $v$ means the variation in the range of the target taking place during the time of flight stated of the projectile, the magnitude of which in its turn, is given by the equation 2. $v = T.w$ in which T denotes the time of flight and $w$ the variation in the range referred to the unit of time.

Equation 1 therefore passes over into the form

3. $S^1 = S + T.w$ in which the term $T.w$ may be positive, negative or equal to zero, according as $w$ possesses a positive or a negative value or is itself equal to zero.

It follows from equation 3, that with the proportions stated of the ratio of transmission according to the adjustment of the hand wheel $f^2$ to the time of flight of the projectile during the rotation of the drum C taking place under the action of the clockwork movement B, it is no longer the range S of the target at the moment, which can be read off on the range graduation $g^2$, but a range $S^1$ of the target which differs from the range at the moment by the variation, which ensues during the flight of the projectile.

If, for the purpose of reading off on the range graduation, that variation of the range of the target is also to be allowed, for that which is proportional to the delay, which ensues between the giving of the order to fire and the actual firing of the gun, it is merely necessary to adjust the division mark of the seconds graduation $m^1$ corresponding to the time of flight not to the fixed mark $a^4$ but to the mark $n^1$, which is movable by the aid of the slide N and which has been adjusted along the correcting graduation $a^7$ to correspond to the delay which ensues between the giving of the order to fire and the actual firing of the gun.

As is obvious without any exhaustive explanation equation 3 in this case passes over into the further equation

4. $S^2 = S^1 + U$ in which U denotes the variation in the range of the target corresponding to the delay, which ensues between the giving of the order to fire and the actual firing of the gun.

The apparatus described therefore offers the advantage without any measurement of the time or any calculations being necessary of enabling in addition to the variation in the range of the target referred to the unit of time the actually existing range of the target or the range of the target, which applies after the expiration of the time of flight of the projectile and of the delay, which ensues between the giving of the order to fire and the actual firing of the gun to be read off at any moment.

Without altering the essential features of the invention, the graduation drum may be provided with a not uniform distance graduation instead of a uniform seconds graduation.

The man in charge of the apparatus would in such case not need to take the time of flight of the projectile from the table of ranges but could adjust the range of the target obtained by means of a range finder or read off on the graduation $g^2$ and set such reading on range graduation drum against mark $a^4$ or the movable mark $n^1$.

In the arrangement of a range graduation the graduated drum M must however be exchanged for another one with a correspondingly different graduation, if the gun be fired with a different charge for example.

Claims:

1. An apparatus for determining a magnitude which varies with time which comprises a movable member being provided with a multiplicity of lines radiating from one point, said lines each representing a fixed value of variation, referred to the unit of time of the said magnitude, a member having a graduation disposed adjacent said movable member, said two members being movable transversely with respect to each other the graduation of said graduated member being divided into units of said magnitude based on the same unit as said radiating lines, constant speed means for moving said movable member and means for moving said graduated member whereby the magnitude to be determined is indicated by the intersection of a selected radiating line with a division line of said graduation.

2. An apparatus for determining a magnitude which varies with time which comprises a rotatable drum, a multiplicity of helical lines radiating from one point, said radiating lines representing a fixed constant variation of range referred to the unit of time, a tape arranged parallel to the axis of said drum and adjacent the face thereof, said tape being provided with a series of graduations representing a unit of range based upon the unit of range of said radiating lines, means for rotating said drum at a pre-determined constant speed in the direction opposite to the radiation of said lines and means for moving said tape to bring the graduation representing a given range to register with the point on said rotatable member from which said helical lines radiate.

3. An apparatus for determining a magnitude which varies with time which comprises a rotatable drum, a multiplicity of helical lines radiating from one point, said radiating lines representing a fixed constant variation of range referred to the unit of time, a tape arranged parallel to the axis of said drum and adjacent the face thereof, said tape being provided with a series of graduations representing a unit of range based upon the unit of range of said radiating lines, means for rotating said drum at a pre-determined constant speed in the direction opposite to the radiation of said lines and means for moving said tape to bring the graduation representing a given range to register with the point on said rotatable member from which said helical lines radiate, a pointer arranged adjacent said tape and means for moving said pointer along said tape and longitudinally of said drum whereby the magnitudes referred to the unit of time and in combination with the range graduations may be always determined.

4. An apparatus for determining a magnitude which varies with time which comprises a rotatable member, a multiplicity of helical lines radiating from one point, said radiating lines representing a fixed constant variation of range referred to the unit of time, a tape arranged parallel to the axis of said drum and adjacent the face thereof, said tape being provided with a series of graduations representing a unit of range based upon the unit of range of said radiating lines, means for rotating said drum at a pre-determined constant speed in the direction opposite to the radiation of said lines and means for moving said tape to bring the graduation representing a given range to register with the point on said rotatable member from which said helical lines radiate and means for stopping said rotatable member in a position in which the point from which said helical lines radiate is opposite said range graduations.

5. An apparatus for determining a magnitude which varies with time which comprises a rotatable member, a multiplicity of helical lines radiating from one point, said radiating lines representing a fixed constant variation of range referred to the unit of time, a tape arranged parallel to the axis of said drum and adjacent the face thereof, said tape being provided with a series of graduations representing a unit of range based upon the unit of range of said radiating lines, a clock-work movement for rotating said drum at a pre-determined constant speed in the direction opposite to radiation of said lines and means for moving said tape to bring the graduation representing a given range to register with the point on said rotatable member from which said helical lines radiate and means for imparting a preliminary rotative adjustment to said drum to compensate for firing delay.

6. An apparatus for determining a magnitude which varies with time which comprises a rotatable member, a muliplicity of helical lines radiating from one point, said radiating lines representing a fixed constant variation of range referred to the unit of time, a tape arranged parallel to the axis of said drum and adjacent the face thereof, said tape being provided with a series of graduations representing a unit of range based upon the unit of range of said radiating lines, means for rotating said drum at a pre-determined constant speed in the direction opposite to the radiation of said lines and means for moving said tape to bring the graduation representing a given range to register with the point on said rotatable member from which said helical lines radiate and means for imparting a preliminary rotative adjustment to said drum to compensate for firing delay which comprises a member adapted to be secured to rotate with said drum, said member being provided with seconds graduations, a fixed reading-off mark cooperating with said graduations and an adjustable seconds mark, substantially as described.

7. An apparatus of the class described which comprises a rotatable member, the surface of which is provided with a series of radiating lines, a series of graduations arranged adjacent the surface of the rotatable member and movable axially of the rotating member, constant speed means for rotating said member and means for moving the series of graduations.

8. An apparatus of the class described which comprises a rotatable drum, upon the surface of which are a series of radiating lines representing a fixed constant variation of range referred to the unit of time, a tape arranged parallel to the axis of said drum and adjacent the face thereto, said tape carrying a series of graduations representing corresponding range values, means for moving said tape longitudinally of the drum and means for rotating said drum at a constant predetermined speed.

9. An apparatus of the class described which comprises a rotatable drum the surface of which is provided with a series of radiating lines representing a fixed constant variation of range referred to the unit of time, a tape provided with a series of graduations arranged parallel to the axis of said drum said graduations representing corresponding range values, means for moving said tape longitudinally of the drum, a pointer arranged adjacent said tape, means for moving said pointer along said tape and longitudinally of said drum and means for rotating said drum at a predetermined constant speed.

10. An apparatus of the class described which comprises a rotatable drum, the surface of which carries a series of helical lines representing a fixed constant variation of range referred to the unit of time, a tape disposed adjacent said drum and carrying a series of graduations representing corresponding range values, means for moving said tape longitudinally of said drum, means for rotating said drum at a constant predetermined speed and additional means for manually rotating said drum.

11. An apparatus of the class described which comprises a rotatable drum, the surface of which carries a series of helical lines representing a fixed constant variation of range referred to the unit of time, a tape disposed adjacent said drum and carrying a series of graduations, representing corresponding range values means for moving said tape longitudinally of said drum, means for manually adjusting said rotatable drum and means carried by said manual operating means for indicating the degree of manual adjustment imparted to said drum.

The foregoing specification signed at Essen, Germany, this 27th day of May, 1920.

DR. WALTHER AKEMANN.
In the presence of—
HANS GOTTSMANN,
JOSEF ALBERTZ.